Patented June 8, 1926.

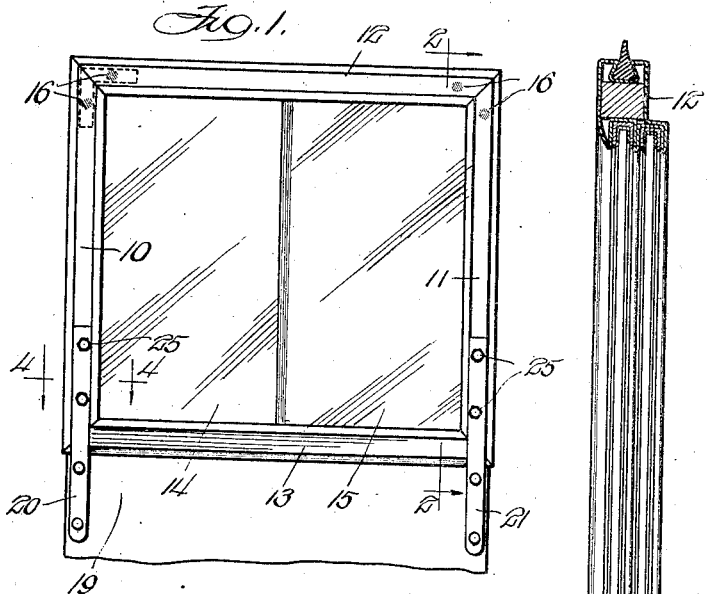

1,587,712

UNITED STATES PATENT OFFICE.

JOSEPH J. FOLEY, OF CHICAGO, ILLINOIS.

INCLOSURE FOR AUTOMOBILES.

Application filed May 31, 1924. Serial No. 716,878.

My invention relates to inclosures for automobiles.

One of the objects of my invention is to provide an improved panel for closing the space between the upper edge of the side of the automobile and the said edge of the roof or top of the automobile.

A further object of my invention is to provide such a panel which will be durable and efficient in use and cheap to manufacture.

A further object of my invention is to provide an improved mounting for the glass in such a panel.

Further objects will appear from the description and claims.

In the drawings, in which an embodiment of my invention is shown—

Figure 1 is a side elevation of a ventilation and vision panel;

Fig. 2 is a section on the line 2—2 of Fig. 1;

Fig. 3 is an edge elevation of the frame;

Fig. 4 is an enlarged sectional view on the line 4—4 of Fig. 1; and

Fig. 5 is a partly assembled view of the metal parts of the frame.

Referring now to the drawing in detail, the construction shown comprises a rectangular frame of tubular sheet metal comprising the vertical side sections 10 and 11, the upper section 12 and the lower section 13, and two panes of glass 14 and 15, mounted in channels in the tubular frame sections.

The upper frame section 12 is united by welding to the two vertical side sections 10 and 11 as indicated at 16 in Figs. 1 and 5, and the lower frame section 13 is detachably secured to the vertical side sections 10 and 11 by means of the angular corner braces 17 and 18. The frame is secured to the upper edge of the side 19 of the automobile by means of a pair of brackets or strips 20 and 21. These brackets 20 and 21, the corner braces 17 and 18 and the vertical side sections 10 and 11 of the frame are provided with registering openings 22, 23 and 24, respectively, into which securing screws 25 extend, the opening in the corner braces being tapped for the reception of these screws. Thus, the same screws are used to detachably secure the lower frame section to the rest of the frame and to secure the brackets 20 and 21 to the frame. The corner braces 17 and 18 may be secured to the lower frame section by spot-welding the side faces of the frame section to the side faces of the angular braces as indicated at 26 and 27. By this method of construction, I am able to use spot-welding or other forms of welding for the two upper corners of the frame as indicated at 16, and to use spot-welding or other methods of welding for securing the angular braces 17 and 18 to the lower frame section 13.

As shown in Fig. 4, the tubing is provided with two parallel re-entrant channels 28 and 29 located side-by-side for the reception of the edges of the panes of glass 14 and 15. One of the re-entrant channels 28 extends laterally beyond the main body portion of the tubing, forming an angle between this laterally extending flange and the side 30 of the main body of the tubing in which angle is located the bracket or strip 20 which secures the frame to the car body.

In order to provide for the sliding movement of the panes of glass 14 and 15, I cement a channel of felt 31 to the inner surface of a rubber channel 32 which, in turn, is seated in one of the channels 28 or 29 of the frame. This felt enables the glass to slide easily and the rubber forms a resilient backing for the felt to take care of slight discrepancies in the thicknesses of the pane of glass or the width of the channel, due to inaccuracies in manufacture or other causes.

As shown in Fig. 3, the upper edge of the frame may close against a strip 33 secured to the side edge 34 of the roof or top of the automobile.

It will be noted that the thinner portion of the upper section of tubing engages the strip 33. This makes the outside of the frame flush with the outside of an adjacent frame even if the adjacent frame is a non-ventilating panel; that is to say, one carrying only one pane of glass.

While I have shown but one form of my invention, it is understood that it may be embodied in other forms covered and defined by the appended claims.

Having thus described my invention, what I claim as new and desire to secure by Letters Patent of the United States is:

1. A vision panel for closing the space between the upper edge of the side of the automobile and the side edge of the roof of the automobile comprising a rectangular frame of metal tubing having vertical sections and horizontal sections, the top section being connected by welding to the two vertical side sections, the side sections having channels to receive a pane of glass, the bottom section being detachably secured to the side sections and being removable to permit insertion and removal of the glass, a pair of corner braces securing the lower section to the vertical section, each corner brace having a horizontal leg fitting in the lower section and a vertical leg fitting in one of the side sections, a pair of brackets for securing the frame to the side of the automobile, said brackets vertical sections and corner braces having alined openings therein, and screws in said alined openings for securing the brackets and corner braces to the vertical sections.

2. A vision panel for closing the space between the upper edge of the side of the automobile and the side edge of the roof of the automobile comprising a rectangular frame of metal tubing having vertical sections and horizontal sections, the top section being connected by welding to the two vertical side sections, the side sections having channels to receive a pane of glass, the bottom section being detachably secured to the side sections and being removable to permit insertion and removal of the glass, a pair of corner braces securing the lower section to the vertical section, each corner brace having a horizontal leg fitting in the lower section and a vertical leg fitting in one of the side sections, a pair of brackets for securing the frame to the side of the automobile, said brackets, vertical sections and corner braces having alined openings therein, and screws extending through said alined openings for securing the brackets and corner braces to the vertical sections, said lower section being connected by welding to the corner braces.

3. A vision panel for closing the space between the upper edge of the side of an automobile and the side edge of the roof of the automobile comprising a rectangular frame of metal tubing having vertical sections and horizontal sections, some of the said sections having a main tubular portion and having a pair of re-entrant channels located side-by-side to receive the edges of two panes of glass, one of said channel portions extending laterally beyond the main tubular portion, and a bracket secured to said frame and lying in the angle formed by the main body portion and the laterally extending portion of said channel.

In witness whereof. I have hereunto subscribed my name.

JOSEPH J. FOLEY.